(12) United States Patent
Raff

(10) Patent No.: US 6,785,868 B1
(45) Date of Patent: Aug. 31, 2004

(54) METHOD AND APPARATUS FOR MANAGING CALENDAR INFORMATION FROM A SHARED DATABASE AND MANAGING CALENDAR INFORMATION FROM MULTIPLE USERS

(75) Inventor: Chris Raff, San Francisco, CA (US)

(73) Assignee: Palm Source, Inc., Sunnyvale, CA (US)

( * ) Notice: Subject to any disclaimer, the term of this patent is extended or adjusted under 35 U.S.C. 154(b) by 716 days.

(21) Appl. No.: 09/585,711

(22) Filed: May 31, 2000

(51) Int. Cl.[7] ............................................. G06F 15/00
(52) U.S. Cl. .................. 715/530; 715/500.1; 707/10; 709/203; 709/400
(58) Field of Search .............................. 715/530, 500.1, 715/511, 526; 707/201, 202, 203, 10; 709/227, 400, 203

(56) References Cited

U.S. PATENT DOCUMENTS

| | | | | |
|---|---|---|---|---|
| 5,392,390 A | * | 2/1995 | Crozier | 345/762 |
| 5,666,530 A | * | 9/1997 | Clark et al. | 707/201 |
| 5,727,202 A | * | 3/1998 | Kucala | 707/10 |
| 5,832,489 A | * | 11/1998 | Kucala | 707/10 |
| 5,928,329 A | * | 7/1999 | Clark et al. | 709/227 |
| 6,317,797 B2 | * | 11/2001 | Clark et al. | 710/5 |
| 6,477,543 B1 | * | 11/2002 | Huang et al. | 707/200 |
| 6,633,924 B1 | * | 10/2003 | Wu et al. | 719/328 |

* cited by examiner

Primary Examiner—Joseph Feild
Assistant Examiner—Maikhanh Nguyen
(74) Attorney, Agent, or Firm—Wagner, Murabito & Hao LLP

(57) ABSTRACT

A method and system for synchronizing and using calendar information from a shared database. Calendar information can be stored in a shared database, and accessed and synchronized with one or more portable computer systems. Calendar information stored on the shared database can be assigned a unique category type. Multiple portable computer systems can then access the shared calendar information which can be displayed on each computer system along with the system's own calendar information. The unique category type is different from the default type of each system's own calendar information and the user is not able to change category types on the portable computer system. Shared calendar information can be viewed and edited and then easily removed using the unique category type.

22 Claims, 24 Drawing Sheets

400

```
ENTER
  ↓
```

SHARED DATABASE FILE IS CREATED CONTAINING CALENDAR INFORMATION INCLUDING EVENT TIMES, DATES, LOCATIONS AND EVENT NAMES, ALL CALENDAR INFORMATION IS ASSIGNED A UNIQUE PREDEFINED DATA CATEGORY, E.G., TRADESHOWZ
405

USER CONNECTS HIS/HER INDIVIDUAL PORTABLE COMPUTER SYSTEM INTO SLOT TO RECEIVE SHARED CALENDAR INFORMATION FROM A CENTRAL SERVER COMPUTER
410

ALL CALENDAR INFORMATION IS DISPLAYED TOGETHER ON USER'S COMPUTER SCREEN INCLUDING SHARED CALENDAR INFORMATION AND USER'S INDIVIDUAL CALENDAR INFORMATION (OPTIONALLY, DISPLAY ATTRIBUTES CAN DIFFERENTIATE BETWEEN THE CATEGORIES SO THAT DIFFERENTIATION IS AVAILABLE BETWEEN TRADE SHOW AND INDIVIDUAL DATA), EG, USER CAN EASILY DETERMINE WHEN TRADE SHOW EVENTS ARE TO OCCUR BY INSPECTING HIS/HER COMPUTER DISPLAY
415

USER CAN MODIFY ALL CALENDAR INFORMATION INCLUDING THE SHARED CALENDAR INFORMATION AND USER'S INDIVIDUAL CALENDAR INFORMATION, HOWEVER, THE USER IS NOT ALLOWED TO ALTER THE CATEGORY DESIGNATION OF THE SHARED CALENDAR INFORMATION EG, USER CAN MAKE CHANGES TO SHARED CALENDAR INFORMATION IF AN EVENT CHANGED TIME OR LOCATION, ETC.
420

AT ANY TIME, EG, AT THE END OF THE TRADE SHOW, USER RETURNS TO SHARED DATABASE AND CAUSES SERVER COMPUTER TO DELETE ALL CALENDAR RECORDS HAVING THE "TRADESHOWZ" CATEGORY DESIGNATION, USER'S INDIVIDUAL CALENDAR INFORMATION REMAINS INTACT
425

RETURN

FIGURE 8

| CAT: UNFILED | 444 |

| USER'S INDIVIDUAL CALENDAR INFORMATION (UNFILED CATEGORY) | JAN. 29, 2000 |
|---|---|
| | 9 |
| | 10 CALL JIM |
| | 11 |
| | 12 LUNCH |
| | 1 PROPOSAL FOR ACM'S REVIEW |
| | 2 |
| | 3 |
| | 4 |
| | 5 GET JOHN PRESENT |

442

| CAT: TRADESHOWZ | 448 |

| SHARED CALENDAR INFORMATION (PREDEFINED CATEGORY) | JAN. 29, 2000 |
|---|---|
| | 9 INTRODUCTION |
| | 10 PALM'S SHOW |
| | 11 |
| | 12 FREE BUFFET |
| | 1 H/W TALK |
| | 2 |
| | 3 VOICE REC. TALK |
| | 4 |
| | 5 CLOSE-OUT TALK |

446

CALENDAR DATABASE 440

FIGURE 10A

| | |
|---|---|
| CAT: UNFILED    570 <br><br> JAN. 29, 2000: <br> 9    BREAKFAST WITH SAM <br> 10 <br> 11   MEETING W/BOSS <br> 12 <br> 1 <br> 2    MEETING W/TIM <br> 3    DENTIST <br> 4 <br> 5    GET FLOWERS FOR JAN <br> 6 <br>                            560 | CAT: WIFE    574 <br><br> JAN. 29, 2000: <br> 9    JUNIOR LEAGUE <br> 10   SHOPPING <br> 11 <br> 12 <br> 1    VISIT GRANDMA <br> 2 <br> 3 <br> 4    SOCCER GAME <br> 5 <br> 6    DINNER <br>                            564 |
| CAT: CHILD1    572 <br><br> JAN. 29, 2000: <br> 9    SCHOOL <br> 10 <br> 11   SCIENCE PROJECT TALK <br> 12 <br> 1 <br> 2 <br> 3 <br> 4    SOCCER GAME <br> 5 <br> 6    HOMEWORK <br>                            562 | CAT: CHILD2    576 <br><br> JAN. 29, 2000: <br> 9    SCHOOL <br> 10   PE - SWIMMING <br> 11 <br> 12 <br> 1 <br> 2    CHEERLEADING <br> 3 <br> 4    PIANO LESSONS <br> 5 <br> 6    HOMEWORK <br>                            566 |

CALENDAR DATABASE                                          550

FIGURE 15

| | | | 615 |
|---|---|---|---|
| RECORD | EDIT | OPTIONS | *SHOW/HIDE* |

JAN. 29, 2000
8
9     BREAKFAST WIT
10
11    MEETING WITH BOSS
12
1
2     MEETING W/TIM
3     DENTIST
4
5     GET FLOWERS FOR JAN

NEW   DETAILS   GO TO

| UNFILED | * |
|---|---|
| *WIFE* | * |
| CHILD1 | |
| *CHILD2* | * 600 |

RECORD    EDIT    OPTIONS    *SHOW/HIDE* — 615

| JAN. 29, 2000: | | UNFILED | * |
|---|---|---|---|
| 9 | BREAKFAST WITH SAM | *WIFE* | |
| | W: JUNIOR LEAGUE | CHILD1 | * |
| | C2: SCHOOL | CHILD2 | 600 |
| 10 | W: SHOPPING | | |
| | C2: PE - SWIMMING | | |
| 11 | MEETING W/BOSS | | |
| 12 | | | |
| 1 | W: VISIT GRANDMA | | |
| 2 | MEETING W/TIM | | |
| | C2: CHEERLEADING | | |
| 3 | DENTIST | | |
| 4 | W: SOCCER GAME | | |
| | C2: PIANO LESSONS | | |
| 5 | GET FLOWERS FOR JAN | | |
| 6 | W: DINNER | | |
| | C2: HOMEWORK | | |

NEW    DETAILS    GO TO

9    BREAKFAST WITH SAM
     C1: SCHOOL
10
11   MEETING W/BOSS
     C1: SCIENCE PROJECT TALK
12
1
2    MEETING W/TIM
3    DENTIST
4    C1: SOCCER GAME
5    GET FLOWERS FOR JAN
6    C1: HOMEWORK

NEW   DETAILS   GO TO

METHOD AND APPARATUS FOR MANAGING CALENDAR INFORMATION FROM A SHARED DATABASE AND MANAGING CALENDAR INFORMATION FROM MULTIPLE USERS

BACKGROUND OF THE INVENTION

1. Field of the Invention

The present invention relates to the field of data processing systems. Specifically, the present invention relates to a method and apparatus for synchronizing information between a portable computer system and a computer system having shared scheduling information stored thereon.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

Since palmtop computer systems are very small, full-sized keyboards are generally not efficient input devices. Palmtop computers using keyboards have keyboard devices that are so small that a user cannot touch-type. Furthermore, to use a keyboard device, a user must either place the palmtop computer system down onto a flat surface, so the user can type with both hands, or the user holds the palmtop computer system with two hands and types with thumbs only.

Instead of a keyboard device, some palmtop computers utilize a touch screen and display an image of a small keyboard thereon. When a particular button is pressed or tapped, a small keyboard image is displayed on the display screen. The user then interacts with the on-screen small keyboard image to enter characters, usually one character at a time. To interact with the displayed keyboard image (e.g., "virtual keyboard"), the user taps the screen location of a character with a pen. That corresponding character is then recognized and added to a data entry field, also displayed on the screen. However, for experienced users, the virtual keyboard input system can be a tedious input process.

Instead of using a keyboard device or a displayed keyboard, many palmtop computers employ a pen and a digitizer pad as an input system. The pen and digitizer pad combination works well for palmtop computers because the arrangement allows a user to hold the palmtop computer system in one hand while writing with the pen onto the digitizer pad with the other hand. Most of these pen-based palmtop computer systems provide some type of handwriting recognition system whereby the user can write words and letters on the digitizer pad with a stylus.

In addition to using keyboards, virtual keyboards and the digitizer, it has also proven convenient to exchange data between a computer system and a palmtop computer using a communication interface, such as a serial or parallel input port. A number of programs today transfer data between palmtops and personal computer systems (PCs), but they are currently limited in functionality. For instance, some programs transfer all the information from the palmtop to the PC without regard for the prior content on the PC. These programs assume that changes to that particular data are only made on the palmtop, and that the changes made on the palmtop take precedence over any changes made on the PC. As a result, any independent updates made directly on the PC will be lost.

Other methods track changes, e.g., using "flags," to facilitate synchronization. These methods create update "flags" in each record that has changed, both on the palmtop and the PC. Corresponding files on the palmtop and the PC are then compared, and if one or more flags are set in a file, the file is recognized as having changed. If both the palmtop and PC files have changed, the flags are used to determine which records need to be updated in the other file. The databases of most existing programs, however, do not contain such flags since the databases of most existing programs were not designed to be synchronized. Also, there is no provision in these methods for sharing the scheduling information of or for multiple users with a palmtop computer.

Some programs attempt to synchronize the data on the PC with the palmtop by comparing the information in each application and prompting the user for answers to determine which data to overwrite. For example, U.S. Pat. No. 5,392,390 describes a method for reconciling information between two calendar database files by interrogating the user about which file to update when a difficult case arises. Although these types of programs provide an advantage over programs that assume only one database has changed since they do not indiscriminately overwrite data, they are cumbersome and time consuming. Using these methods, users may have to spend an inordinate amount of time answering questions whenever they attempt to synchronize information between their palmtops and their PCs. Furthermore, none of these systems provide for the management of shared calendar information (of multiple users) with a palmtop computer system.

Other systems, such as those described in U.S. Pat. Nos. 5,727,202, 5,832,489 and 5,884,323 allow data synchronization between a portable computer system and a desktop computer system for the exchange and updating of data. However, like the above described systems, there is no provision for management of a shared data file of calendar information from or for multiple users.

SUMMARY OF THE INVENTION

Accordingly, what is needed is an effective mechanism and method allowing a palmtop computer system to access a shared server system that contains calendar data from multiple users. What is also needed is a system and method for efficiently allowing palmtop computer system to visualize, edit and otherwise manage shared calendar data from multiple users. What is also needed is a system allowing calendar information for a particular event to be stored in a shared server and be used across multiple users. The present invention provides these advantages and others not specifically mentioned above but described in the sections to follow.

A method and system are described for synchronizing and using calendar information from a shared database. Database information can be stored using different category names. Calendar information can be stored in a shared database, e.g., on a server system and accessed and synchronized with one or more portable computer systems. The calendar information is stored using particular category types which facilitate separate manipulation, access and removal of the calendar information when placed onto a portable computer system (e.g., palmtop). In one embodiment, e.g., the "trade show embodiment," calendar information stored on a shared database is assigned a unique category type. Multiple portable computer systems can then go to a central location or station and access the shared calendar information. This shared calendar/schedule information can be displayed on each computer system along with the system's own individual calendar information. The unique category type is different from the default type of each system's own calendar information and while the schedule information can be altered by the user, the user is not able to change category types or their designations on the portable computer system. Shared calendar information can be viewed and edited. When the shared calendar information is no longer needed or useful, the user can return to the central location and have it removed using its unique category type as a filter.

In a second embodiment, e.g., the "family schedule embodiment," different calendar information from different users can be stored in a database of a shared server, each schedule using a respective category type that is assigned to the user. For instance, a "wife" category can be used and a "child1" category and a "child2" category, etc. When the multiple calendar information is loaded into a single portable computer system, a flag can be set to display or hide calendar information of certain categories. For instance, all categories can be shown or just the "wife" calendar data can be shown along with the default category of the user's palmtop computer system. The schedules of multiple people can then be viewed in a single location. Calendar information for any displayed categories can be edited. It is appreciated that all embodiments offer the ability to edit and/or remove the data in other categories.

More specifically, an embodiment of the present invention includes a method of processing information comprising the steps of: a) storing, in a server, first calendar information under a predetermined category name, the first calendar information comprising event name, time and date information; b) transferring the first calendar information from the server to a palmtop computer system, the palmtop computer system having second calendar information stored under a default category name which is different from the predetermined category name, the second calendar information comprising event name, time and date information; c) displaying together portions of the first and the second calendar information on a display screen of the palmtop computer system wherein the predetermined category name and the default category name are both unmodifiable by the palmtop computer system; and d) using the predetermined category name to remove the first calendar information from the palmtop computer system without disturbing the second calendar information.

Another embodiment of the present invention includes a method of processing information comprising the steps of: a) storing, in a server, first and second calendar information stored, respectively, under first and second category names, the first and second calendar information comprising event name, time and date information; b) synchronizing the first calendar information with calendar information of the first category name stored on a first palmtop computer system wherein modifications in the server are reflected in the first palmtop computer system and vice-versa; c) transferring the second calendar information from the server to the first palmtop computer system; d) designating a first flag indicating whether nor not the second calendar information is to be displayed on the first palmtop computer system; e) displaying the first calendar information on a display screen of the first palmtop computer system; and f) displaying the second calendar information, together with the first calendar information, on the display screen provided the first flag indicates that the second calendar information is to be displayed and otherwise not displaying the second calendar information.

BRIEF DESCRIPTION OF THE DRAWINGS

FIG. 8 is a process in accordance with an embodiment of the present invention allowing a palmtop computer access to and management of shared calendar information from a shared server computer system.

FIG. 10A is a logical diagram of a calendar database within a palmtop computer having stored therein personal calendar information of the user of the palmtop computer and also shared calendar information downloaded from a shared server.

FIG. 15 is a logical diagram of contents of a calendar database of a palmtop computer system containing calendar information from multiple users.

FIG. 16 is a palmtop computer displaying calendar information of only its user with a selection window open for displaying other calendar categories, some of which are selected.

FIG. 18 is a palmtop computer displaying calendar information of multiple users with the selection window open for altering the show/hide settings for other categories.

FIG. 19 is a palmtop computer displaying calendar information of two selected calendar categories in accordance with an embodiment of the present invention.

DETAILED DESCRIPTION OF THE INVENTION

In the following detailed description of the present invention, a method and system providing access to a shared database having calendar information and also providing access to a database containing calendar information for multiple users, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Platform

Figure 1:
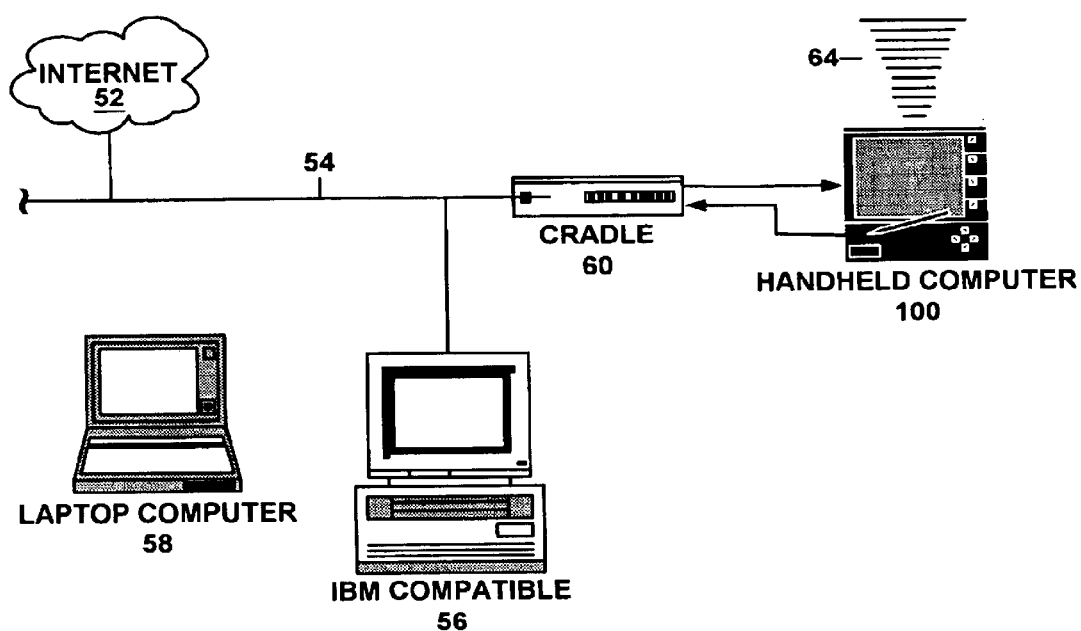
FIG. 1 is system illustration of a palmtop computer system connected to other computer systems and the Internet via a cradle device.

FIG. 1 illustrates a system 50 that can be used in conjunction with various embodiments of the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
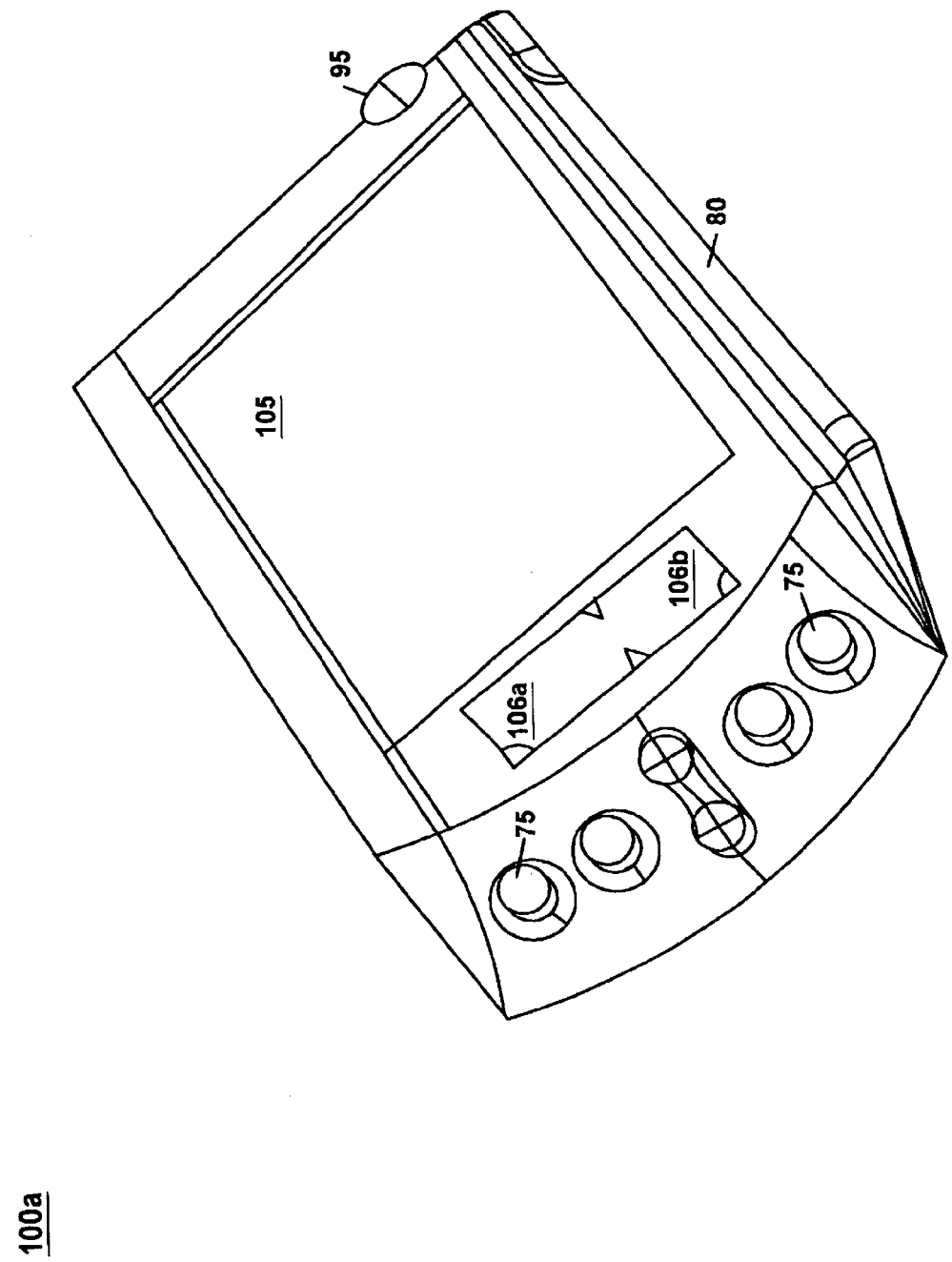
FIG. 2A is a top side perspective view of a palmtop computer system that can be used as a platform for the data entry embodiments of the present invention.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
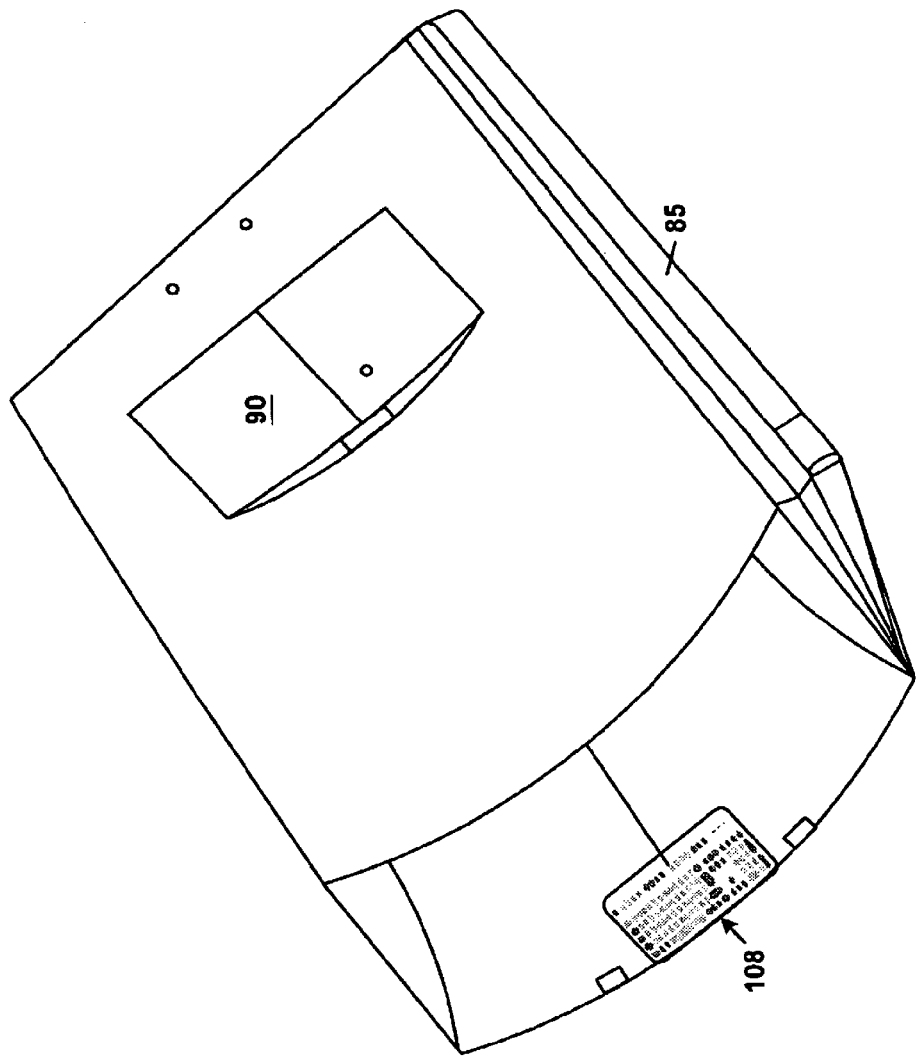
FIG. 2B is a bottom side perspective view of the palmtop computer system of FIG. 2A.

FIG. 2B illustrates the bottom side 100b of one embodiment of the palmtop computer system that can be used in accordance with various embodiments of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 3:
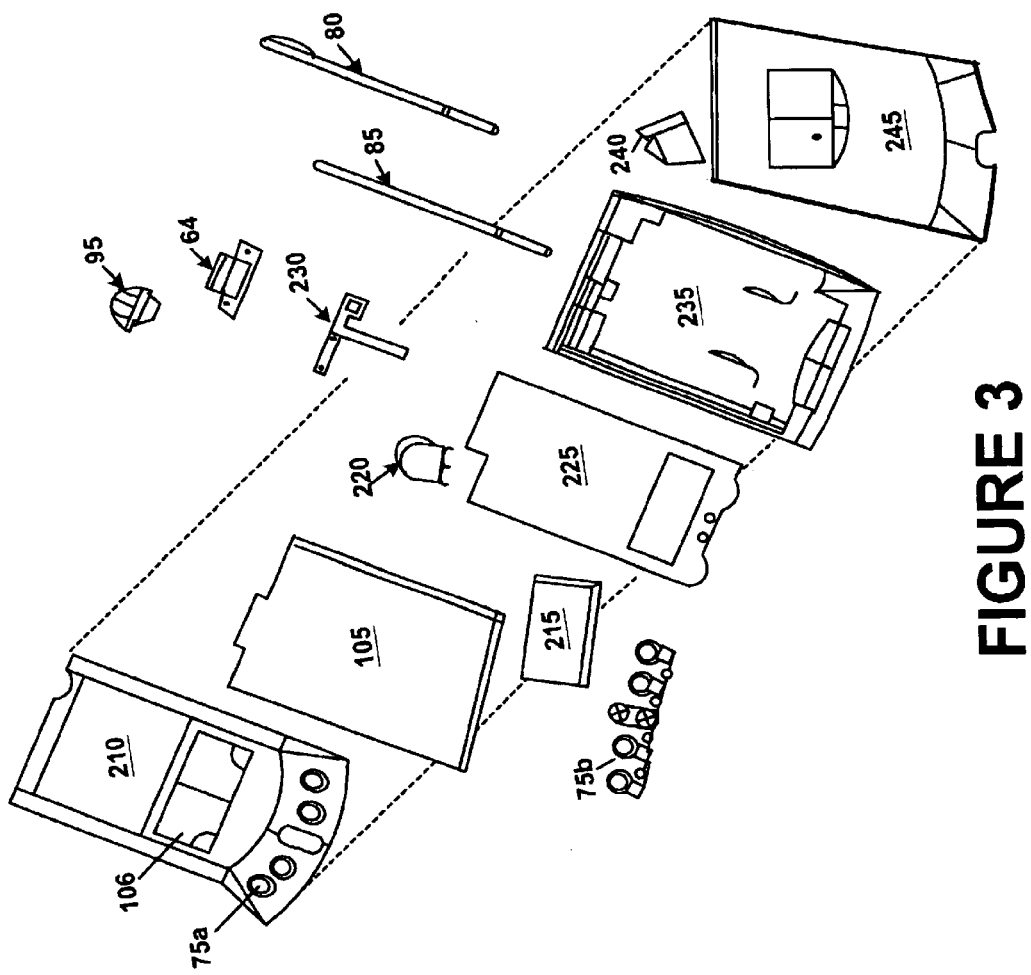
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and, other networked computers and/or the Internet via a proxy server.

Figure 4:
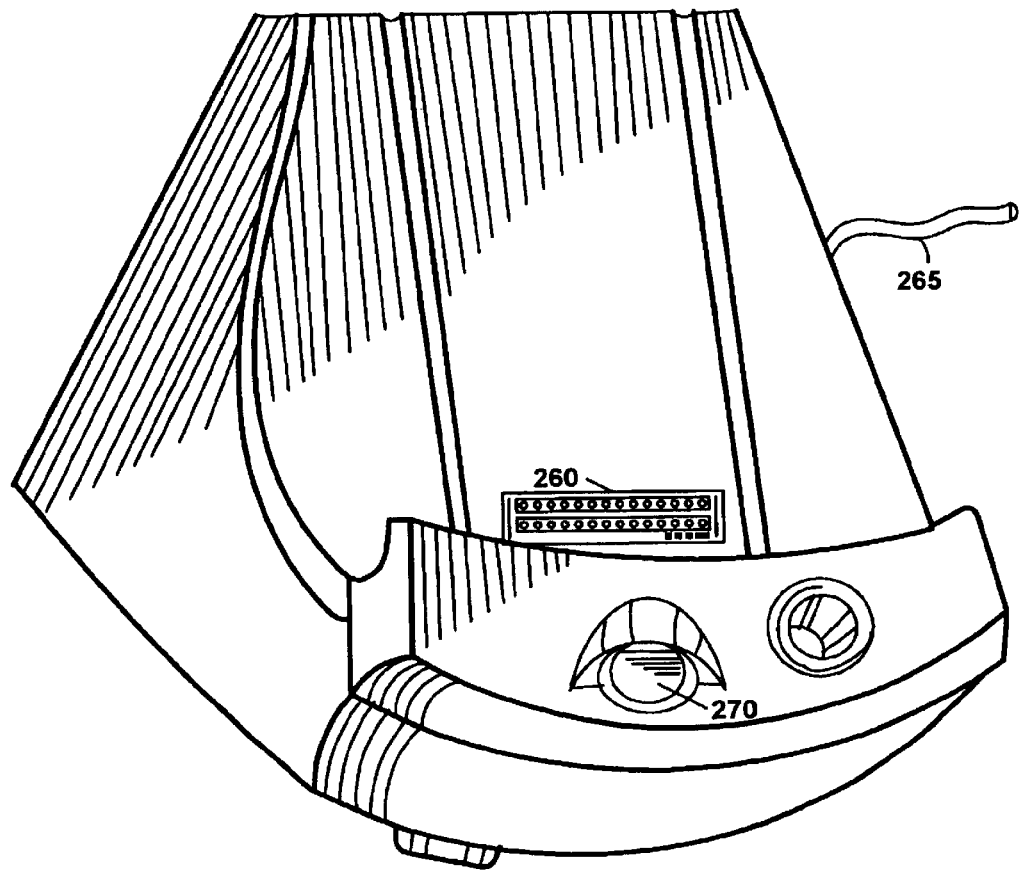
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
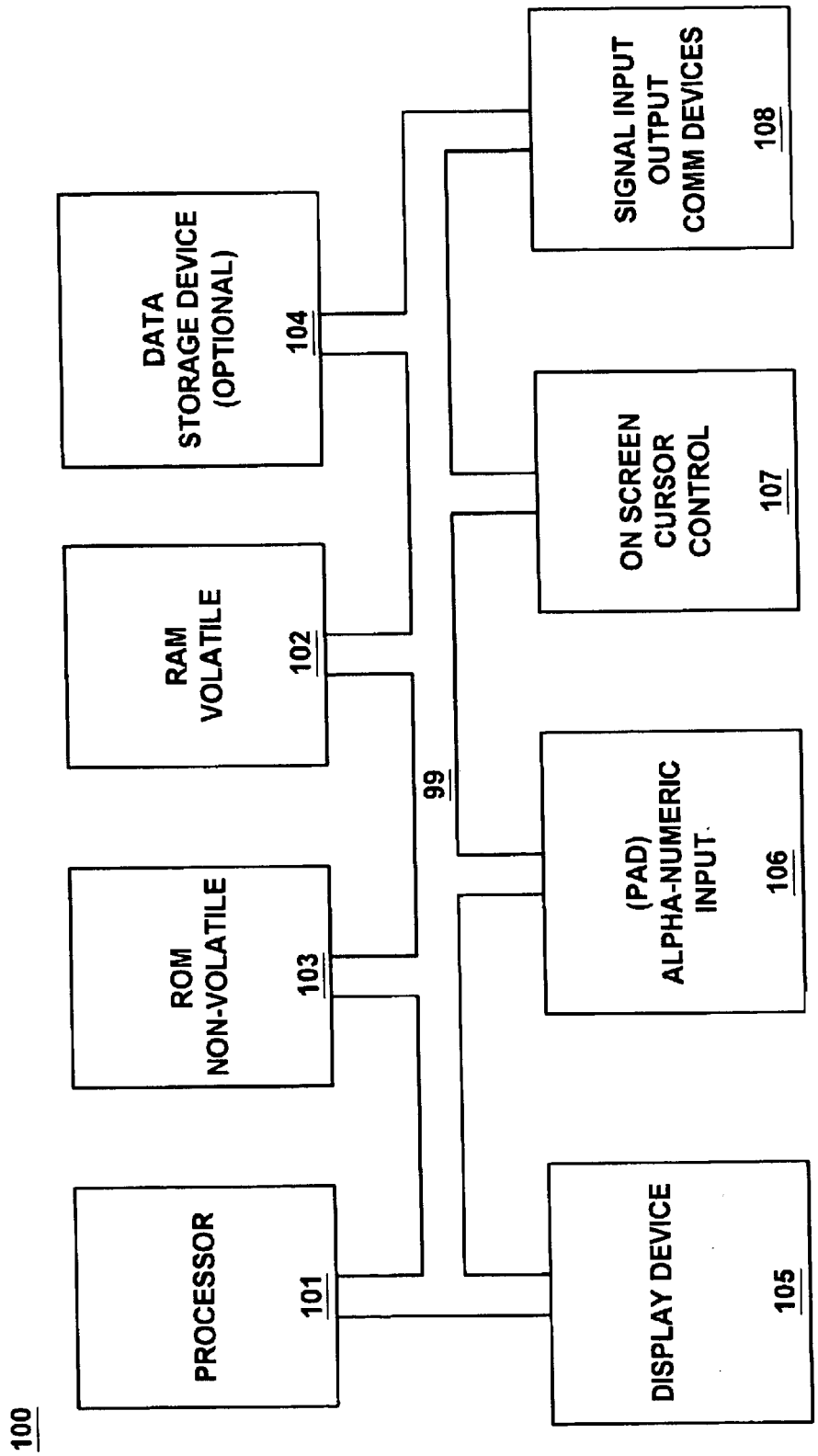
FIG. 5 is a logical block diagram of the palmtop computer system in accordance with an embodiment of the present invention.
Figure 14:
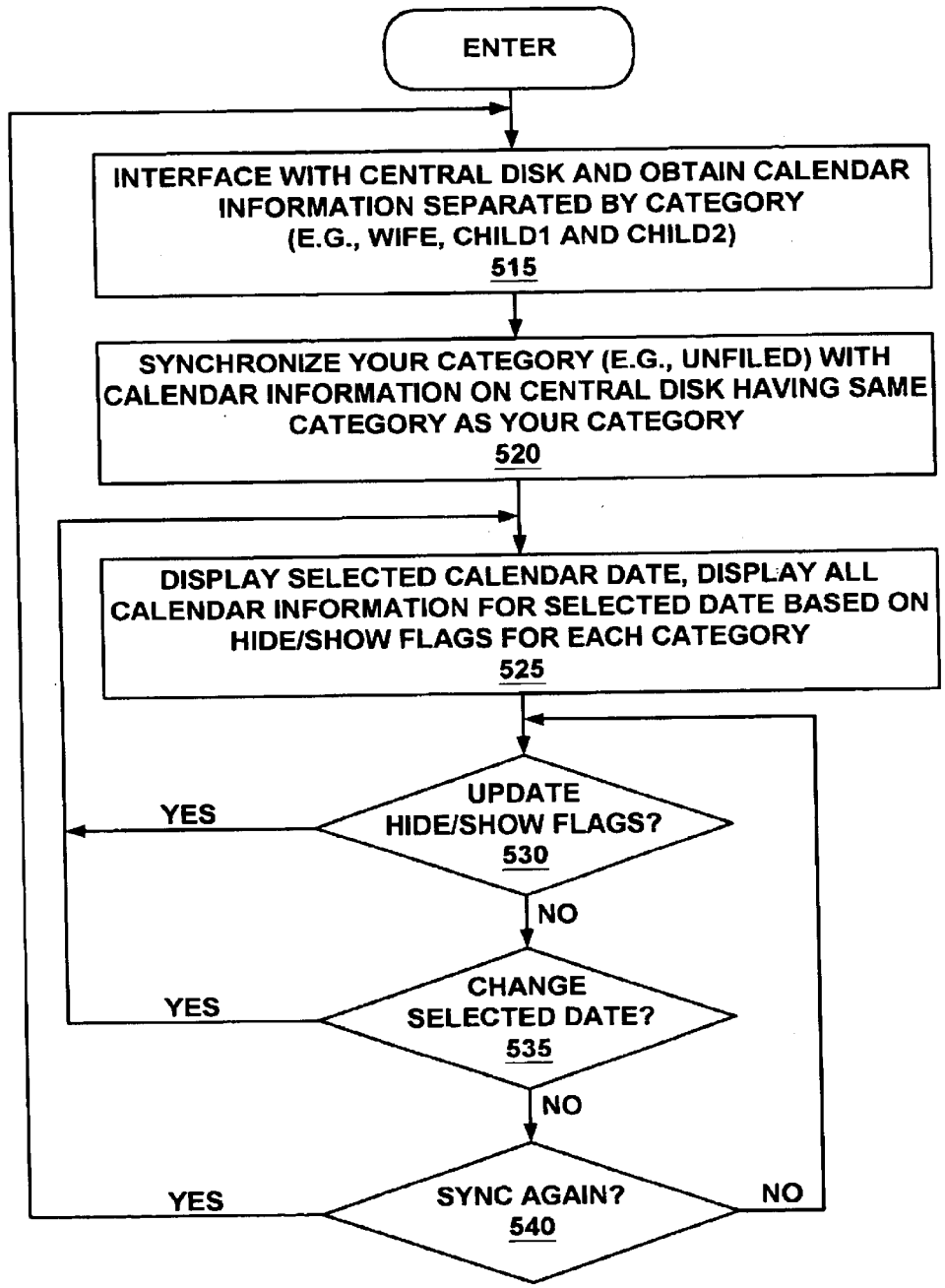
FIG. 14 is a process in accordance with the embodiment of FIG. 13 allowing a palmtop computer system access to a shared server containing calendar information from multiple users.

FIG. 5 illustrates circuitry of computer system 100, some of which can be implemented on PC board 225. The computer system 100 can be used to perform calendar information management processes of the present invention, e.g., process 400 (FIG. 8) and process 510 (FIG. 14). Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a nonvolatile memory 103 (e.g., read only memory ROM) coupled with the bus 99 for storing static information and instructions for the processor, 101. Computer system 100 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 100, the ROM 103 and the RAM 102.

Also included in computer system 100 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Figure 6:
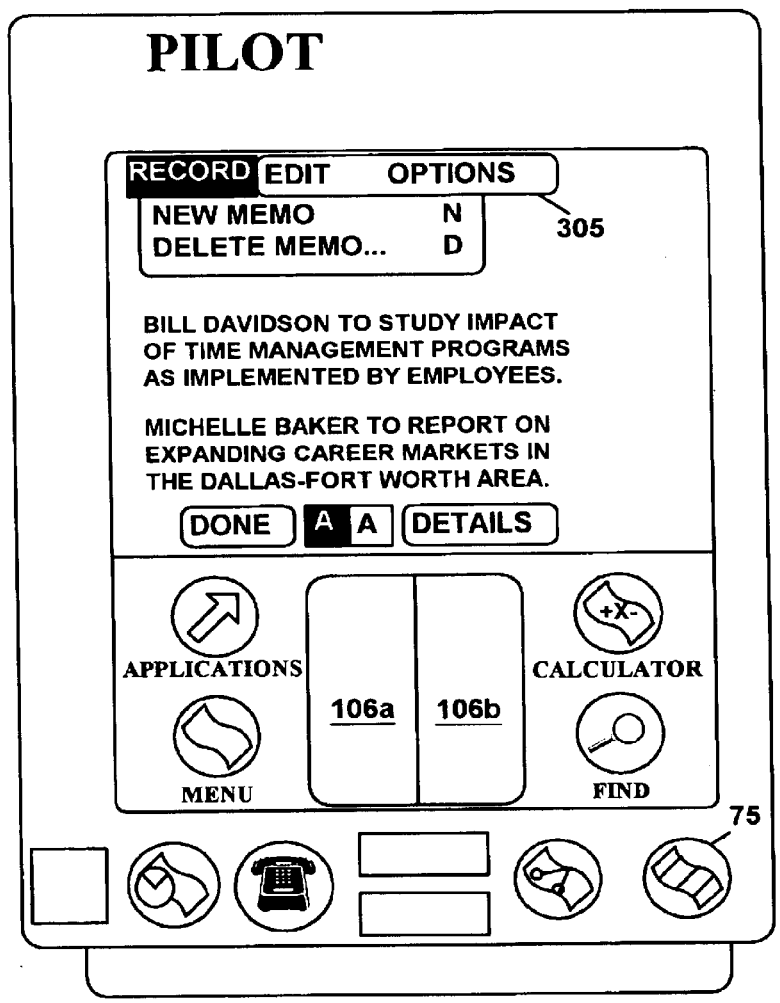
FIG. 6 is a front view of a palm top computer system illustrating the display screen, digitizer regions and an exemplary menu displayed on the display screen.

FIG. 6 is a front view of the palmtop computer system 100 with a menu bar 305 open displaying a pull down window. Also shown are two regions of digitizer 106a and 106b. Region 106a is for receiving user stroke data for alphabet characters, and typically not numeric characters, and region 106b is for receiving user stroke data for numeric data, and typically not for alphabetic characters. An embodiment of the present invention provides improved handwriting character recognition accuracy for a user by using next stroke prediction in combination with the received stroke data. Physical buttons 75 are also shown. Although different regions are shown for alphabetic and numeric characters, the present invention is also operable within a single region that recognizes both alphabetic and numeric characters.

Shared Calendar Information and Calendar Information of Multiple Users

Figure 7A:
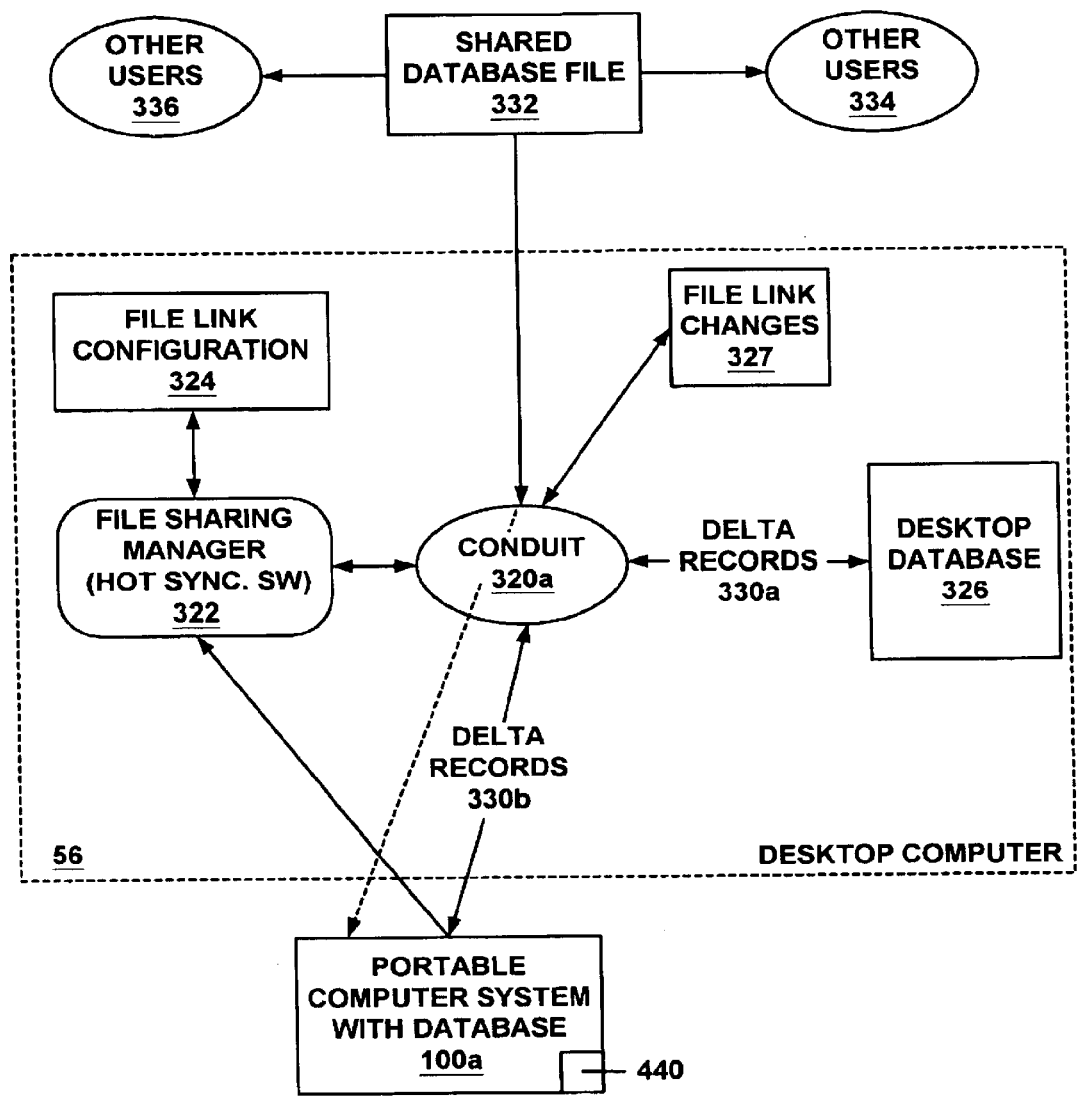
FIG. 7A illustrates a system in accordance with one embodiment of the present invention for allowing a palmtop computer system to access shared calendar information of a unique category type.

FIG. 7A illustrates a system 340 in accordance with an embodiment of the present invention for allowing a palmtop computer system 100a (or any portable computer system) access to a database 332 ("server") that is shared among many other computer systems 334 and 336, some of which can be portable computer systems. In one embodiment, the database 332 particularly stores calendar information, e.g., schedule information containing event names, their dates and times. A desktop computer system 56 contains a desktop database 326, a software manager 322, e.g., a synchronization, e.g., Hot-Synch(TM), software manager, a file link configuration database 324 and a software conduit 320a. The configuration database 324 is linked to the file sharing manager 322 and specifies for a particular database, its source file, category information and the frequency of update for the database. The conduit 320a outlines the manner in which records are to be synchronized between databases under control of the file manager. This process, including the file sharing manager and the conduit, is described in U.S. Pat. No. 5,884,323 by Hawkins et al., issued Mar. 16, 1999, assigned to the assignee of the present invention and hereby incorporated by reference. A file link changes library 327 (one for each user) is also included to allow changes being preserved.

The portable computer system 100a is interfaced with the desktop computer 56 using the cradle 60 (FIG. 1). During synchronization between the portable computer system 100a and the desktop database 326, delta records 330a and 330b are passed through the conduit software module 320a between database 326 and the database of computer 100a under control of the file sharing manager 322. The delta records represent changes (including additions) that occurred on either the computer 100a or on the desktop database 326. After synchronization, the two databases will contain the same information. Namely, records updated on computer 100a are reflected in database 326 and vice-versa. The synchronization process (including the file sharing manager) is described in U.S. Pat. No. 6,006,274 by Hawkins et al., issued Dec. 21, 1999, assigned to the assignee of the present invention and hereby incorporated by reference. Synchronization is also described in U.S. Pat. No. 5,727,202 by Kucala, issued Mar. 10, 1998, assigned to the assignee of the present invention and hereby incorporated by reference and also in U.S. Pat. No. 5,832,489 by Kucala, issued Nov. 3, 1998, assigned to the assignee of the present invention and hereby incorporated by reference.

In some instances, the desktop computer 56 can be interfaced with a shared database file 332, e.g., by a local area network or by the Internet. The shared database file 332 can contain information, such as a central schedule, that is needed by a number of different people. In one embodiment, the central schedule is the schedule of activity for a major event, such as a tradeshow or concert or sporting event, etc., as they pertain to the event. The schedule or "calendar information" describes the event names that are to occur, when they occur, their place and date, etc. The conduit 320a can be used to transfer records from the shared database 332 to the portable computer 100a. It is appreciated that within the present invention, records sent from the shared database 332 to the portable computer 100a be assigned to a special predetermined category name or type. Using the system of FIG. 7A, a user of a portable computer 100a can synchronize to the desktop database 326 (for the calendar information of the default type) and can also download information from the shared database file 332 (thereby getting records of a preselected but different category type). It is appreciated that the shared database file 332 can be connected to desktop computer 56 by the Internet or by a local area network or using a number of other well known techniques.

Figure 7B:
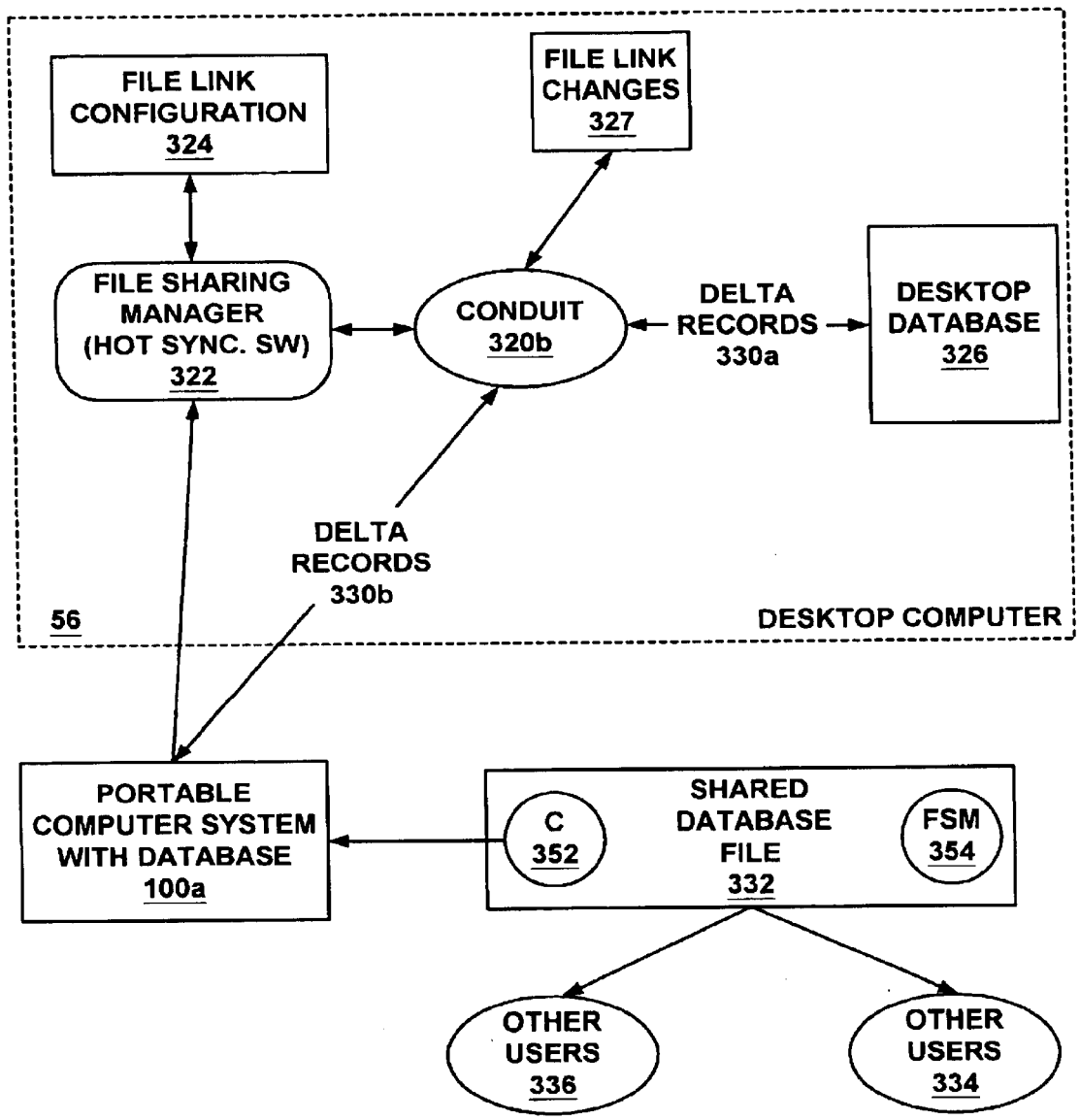
FIG. 7B illustrates a system in accordance with another embodiment of the present invention for allowing a palmtop computer system to access shared calendar information of a unique category type.

FIG. 7B illustrates another implementation 360 of allowing the palmtop computer 100a access to the database 332 that is shared among many other computer systems 334 and 336. In this embodiment, the shared database 332 can be directly accessed by the portable computer 100a without going through the desktop computer 56. In this case, the shared database 332 server contains its own conduit 352 and file sharing manager 354. Shared calendar information of the preselected category type that originates from server 332 can be downloaded directly into the portable computer 100a. The portable computer 100a also interface with desktop computer 56 to perform synchronizations, but it is not necessary for system 100a to be coupled with system 56 in order for system 100a to access the shared calendar information from the server 332.

FIG. 8 illustrates a process 400 in accordance with the "tradeshow" embodiment of the present invention. Process 400 allows calendar information of a predetermined category type or "name" to be downloaded into a portable computer 100a. This calendar information then can be viewed, along with any calendar information already within computer 100a. The calendar information already within computer 100a is stored under a default category name. However, the assignments of category names is transparent to the user of computer 100a. These category names are not displayed nor can they be modified by the user in this embodiment. However, by assigning a predetermined and unique category name to the shared calendar information sent from the server 332, this information can readily be removed from computer 100a without disturbing other calendar information already stored on computer 100a.

Process 400 is described with reference to FIG. 8 and also with reference to FIG. 9–FIG. 12B. At step 405, a shared database of calendar information is created containing event names, times, dates and locations. In one embodiment, the database can be structured using comma separated data, but any data interchange format can be used. In one embodiment, the shared calendar information represents activities related to a public event such as tradeshow, sporting event, other public gathering, festival, concert, conference, meeting, school meeting, church meeting, major event, etc. This calendar information is stored under a common category name, e.g., tradeshowz, that is unique and applies to the event. For instance, if the event is COMDEX in the year 2000, then the category name may be "COMDEX2000."

Figure 9:
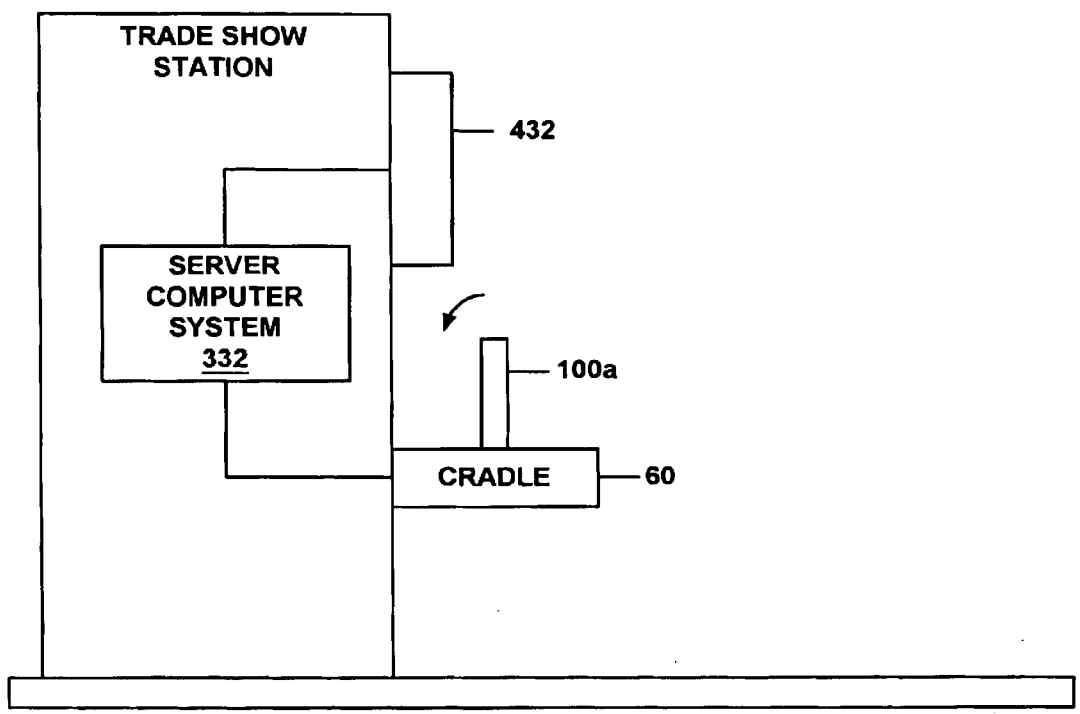
FIG. 9 is a central station, such as for use in a tradeshow environment, containing a server with shared calendar information in accordance with an embodiment of the present invention.

At step 410, the user connects his/her portable computer 100a with a slot at a central station located, for instance, at the event. The central station 430 is shown in FIG. 9 and contains a display 432, the central server 322 and the cradle 60 having a receiving slot therein. The central server 322 then downloads calendar information regarding the event under the predetermined category name to computer 100a. Alternatively, the portable computer 100a can be coupled to a cradle 60 that interfaces with the Internet and thereby couples to the server 332. The central server 332 then downloads calendar information regarding the event under the predetermined category name to computer 100a. In this alternative embodiment, the user does not have to actually go the event in order to get the shared calendar information, but can get the data over the Internet at any place or at any time.

It is appreciated that using either embodiment of step 410, the category name designated for the shared calendar information is going to be different from the default category name assigned to any calendar information that already present within system 100a, e.g., the user's individual or personal calendar information.

FIG. 10A illustrates exemplary contents of the calendar database 440 within system 100a after shared calendar information has been downloaded. As shown, the shared calendar information 446 is stored under the category "tradeshowz" 448 and the users own calendar information 442 is stored under a different category name, "unfiled," 444 which is the default name. Individual or personal calendar information 442 is a listing of descriptors for a particular day, e.g., Jan. 29, 2000, from 9 AM to 5 pm. Some times have event names or memos that relate to the user's personal life. All data within 442 is stored under the "unfiled" category name 444. Shared calendar information 446 is a listing of descriptors for the same day, e.g., Jan. 29, 2000, from 9 AM to 5 pm. Some times have event names or memos that correspond to a tradeshow. All data within 442 is stored under the "tradeshowz" category name 448. Computer 100a can use the category designations 444 and 448 to discriminate between the shared versus personal calendar information.

At step 415 of FIG. 8, all calendar information can be displayed on a display screen of the computer 100a. In one embodiment, portions of the shared and personal calendar information can be displayed together, at the same time, on the display screen 105 (FIG. 2A). In one embodiment, there is no display -attributes that differentiate one category from another. In another embodiment, a letter or category name initial can be used to identify which calendar data line corresponds to which category. Further still, colors can be used to differentiate between the calendar information categories.

Figure 10B:
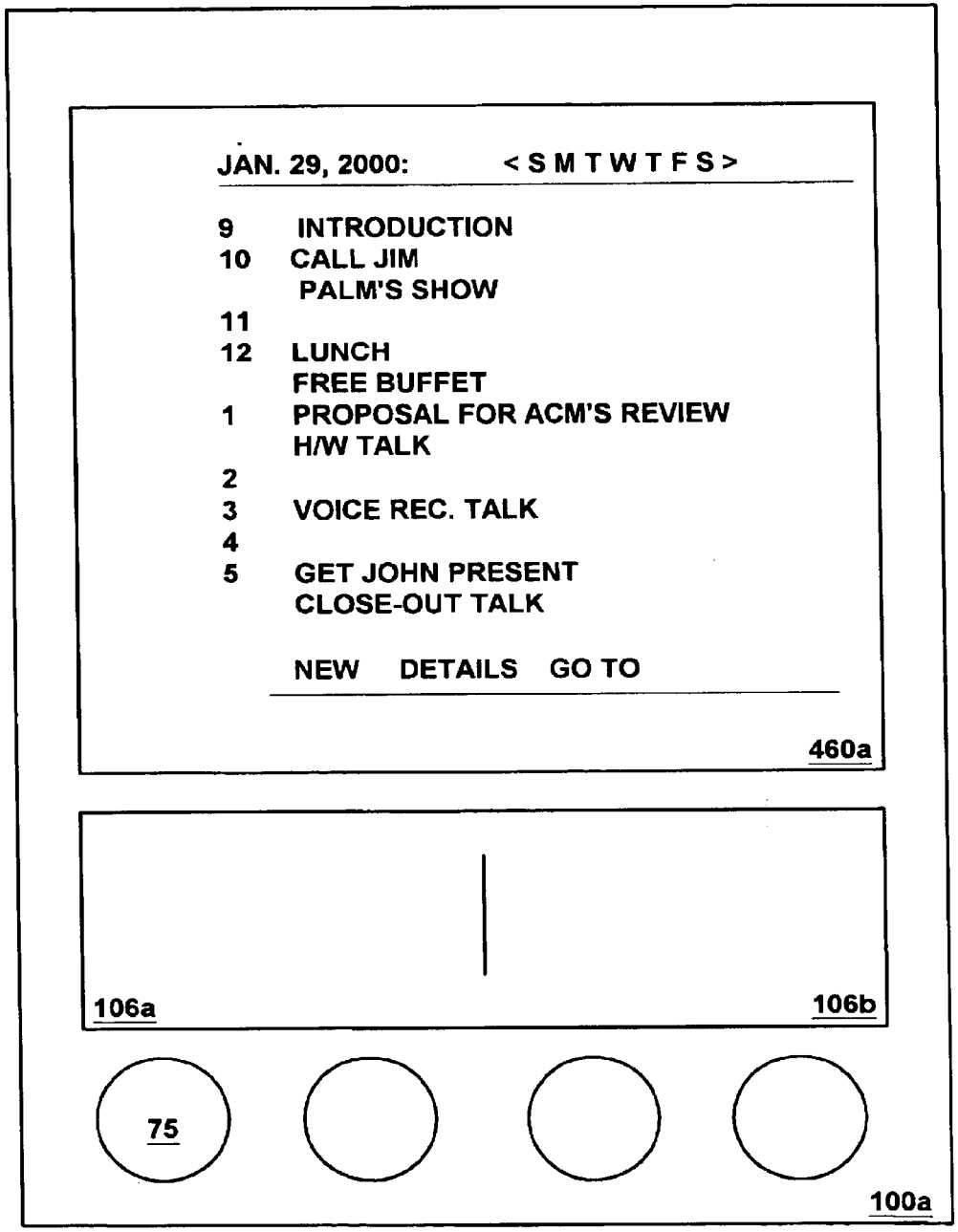
FIG. 10B is an illustration of a calendar application of the palmtop computer of FIG. 10A illustrating calendar information of two categories in accordance with an embodiment of the present invention.

FIG. 10B illustrates an exemplary display 460a of calendar information (from a calendar application program) on computer 100a. In this embodiment, no attributes are used to differentiate the categories of calendar data. The event descriptors and times are merged together with the shared calendar information placed after the individual calendar information when two or more entries exist for the same time. The user can view this display 460a to readily determine the entire day's events including both tradeshow events and personal events.

At step 420 of FIG. 8, the user is allowed to modify any of the shared or personal calendar information. However, the category designations for the calendar information are unmodifiable by the user. For instance, whether or not the category designations can be viewed by the user, computer 100a does not allow the user to alter these designations with respect to the shared calendar information. Further, the computer 100a does not allow the user to alter any of the "unfiled" designations to a "tradeshowz" designation. Therefore, while the shared calendar information 446 can be altered or deleted, their category designations are not changeable.

Figure 11A:
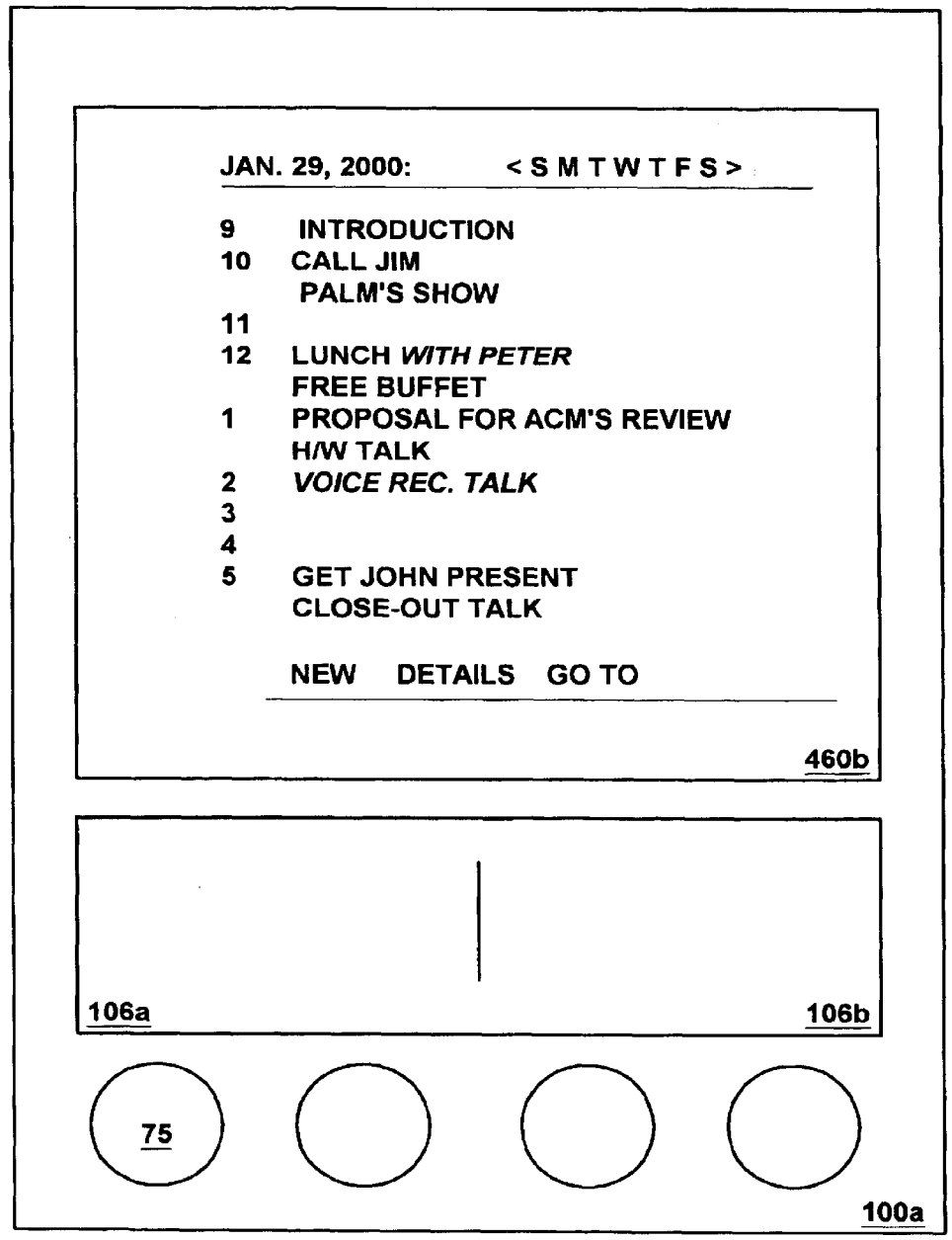
FIG. 11A is an illustration of the calendar information shown in FIG. 10B with user modifications made using on-screen editing.
Figure 11B:
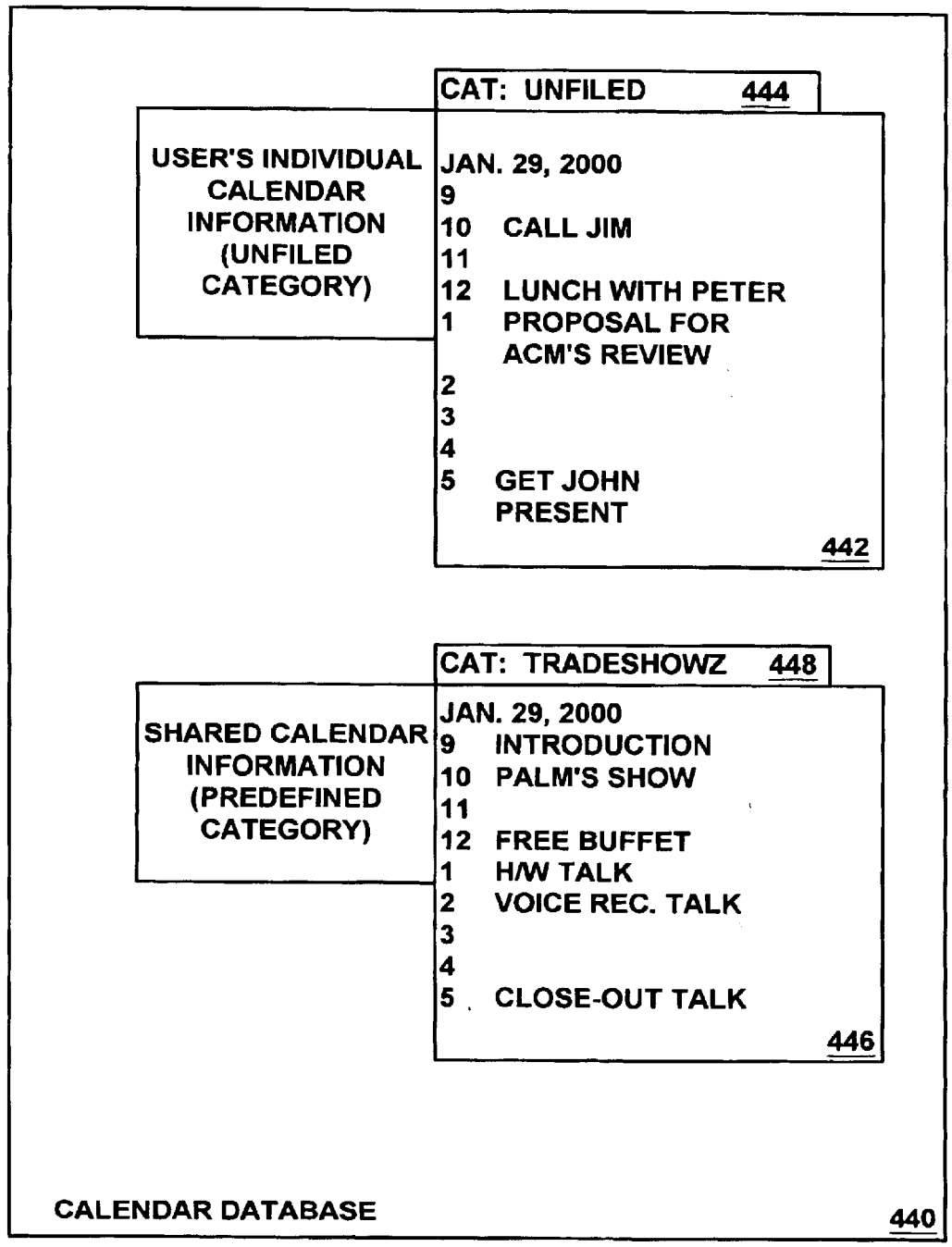
FIG. 11B is a logical diagram of contents of the calendar database after the user modifications of FIG. 11A are made.

FIG. 11A illustrates that the user has modified the "12" hour event by adding "with Peter" and also the "3" pm hour event, "voice rec. talk," has been moved to 2 pm. User editing can be accomplished using on-screen editing and the digitizer pad 106a and 106b. The result of these edits is shown in FIG. 11B. The personal calendar information 442 has been altered at 12. Also, the shared calendar information 446 has been altered at 2 and at 3. However, the category designations have not changed.

Figure 12A:
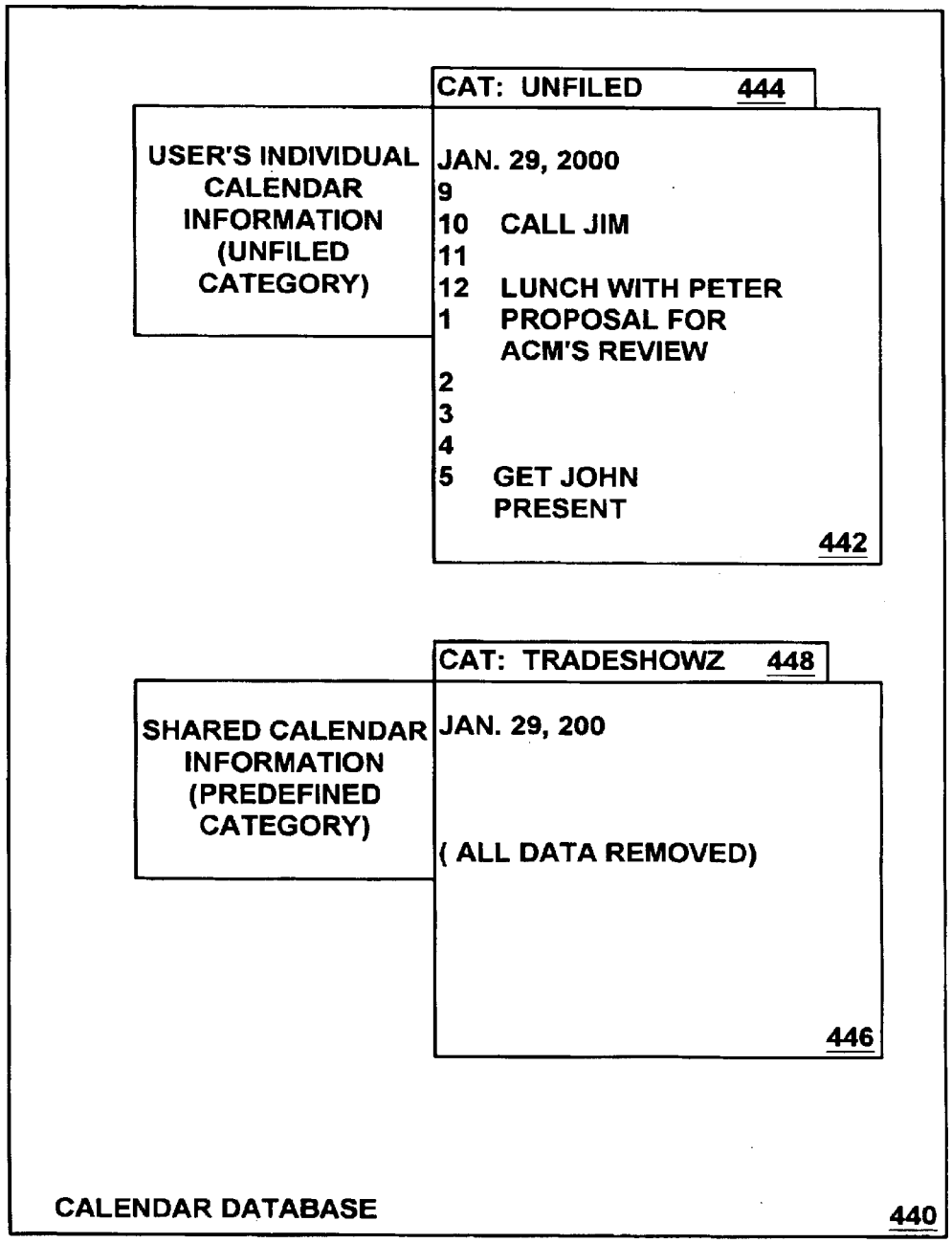
FIG. 12A is a logical diagram of contents of the calendar database after all calendar information of a preselected category are cleared, e.g., by the server computer system.

At step 425 of FIG. 8, the user connects again to the central server 332 and all calendar information associated with the shared category designation 448 is erased (or otherwise removed) from computer 100a. Optionally, the category name itself 448 can also be removed. Step 425 May be processed when the event is over or the shared calendar information is no longer needed by the user, e.g., the user is leaving the event, etc. Step 425 can be accomplished by the user placing the computer 100a back into cradle 60 of central station 430 (thereby connecting to server 332), or by the user connecting to desktop computer 56 that is connected to server 332 via the Internet or some other communication network. The computer 100a uses the predetermined category name 448, e.g., "tradeshowz," to remove the shared category information 446. FIG. 12A illustrates an exemplary database result after step 425. The shared calendar information 446 is completely removed without altering any of the individual calendar information 442. Because the category designation 448 of the shared calendar information 446 is not allowed to be altered, computer 100a can completely remove this data by using the designation 448 as a search key. It is appreciated that all of the shared calendar information is removed by step 425 even though some of this data was edited or changed by the user. Alternatively, the user may wish to preserve the changed data.

Figure 12B:
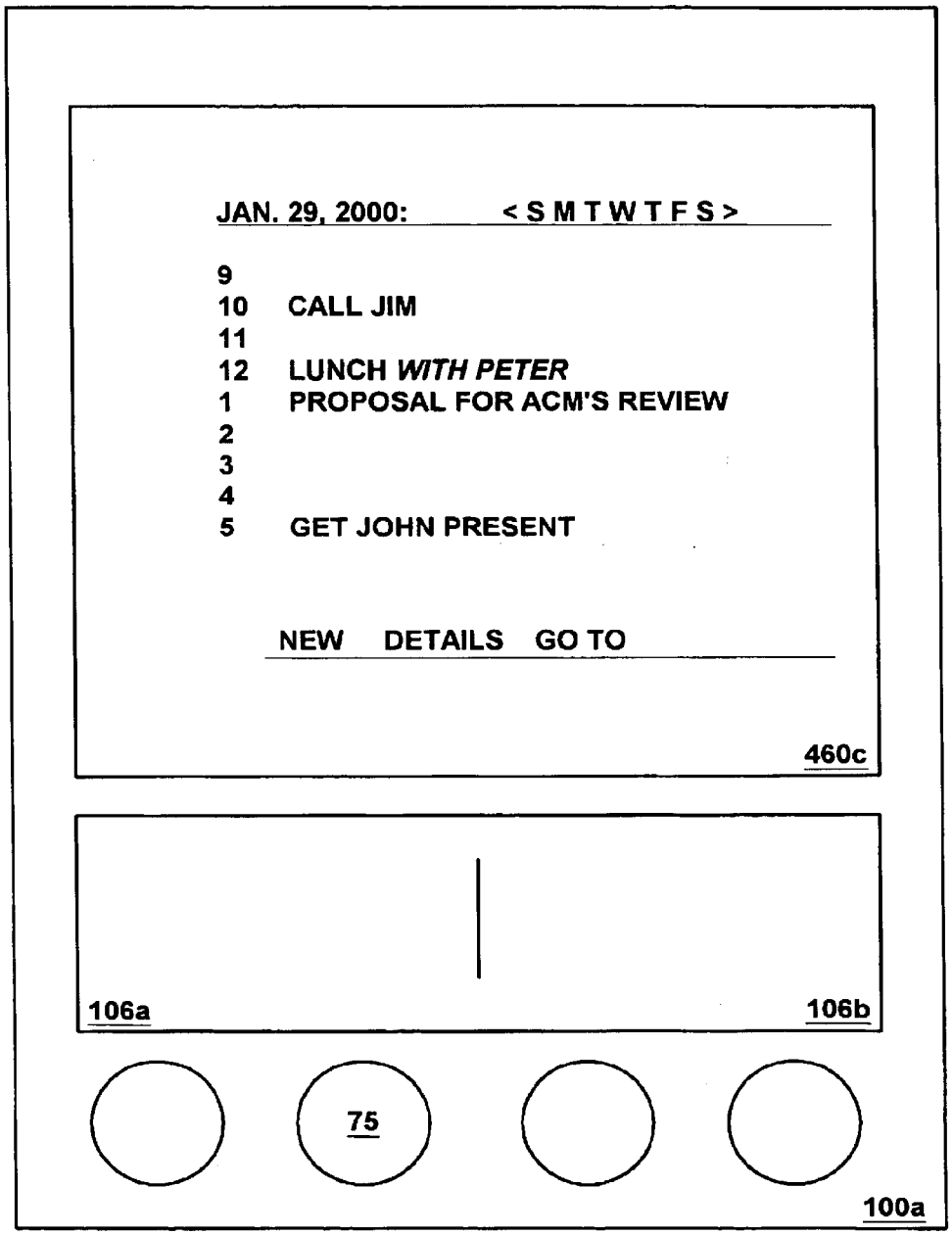
FIG. 12B is an illustration of the display of a calendar application after the changes of FIG. 12A are made in accordance with an embodiment of the present invention.

FIG. 12B illustrates the display of the calendar application on computer 100a after step 425. The user's personal calendar information remains intact and is displayed on display 460c. As shown, the changes the user made to the personal calendar information remain intact after the shared calendar information is removed.

It is appreciated that all embodiments offer the ability to edit and/or remove the data in other categories.

Shared Calendar Information of Multiple Users

Figure 13:
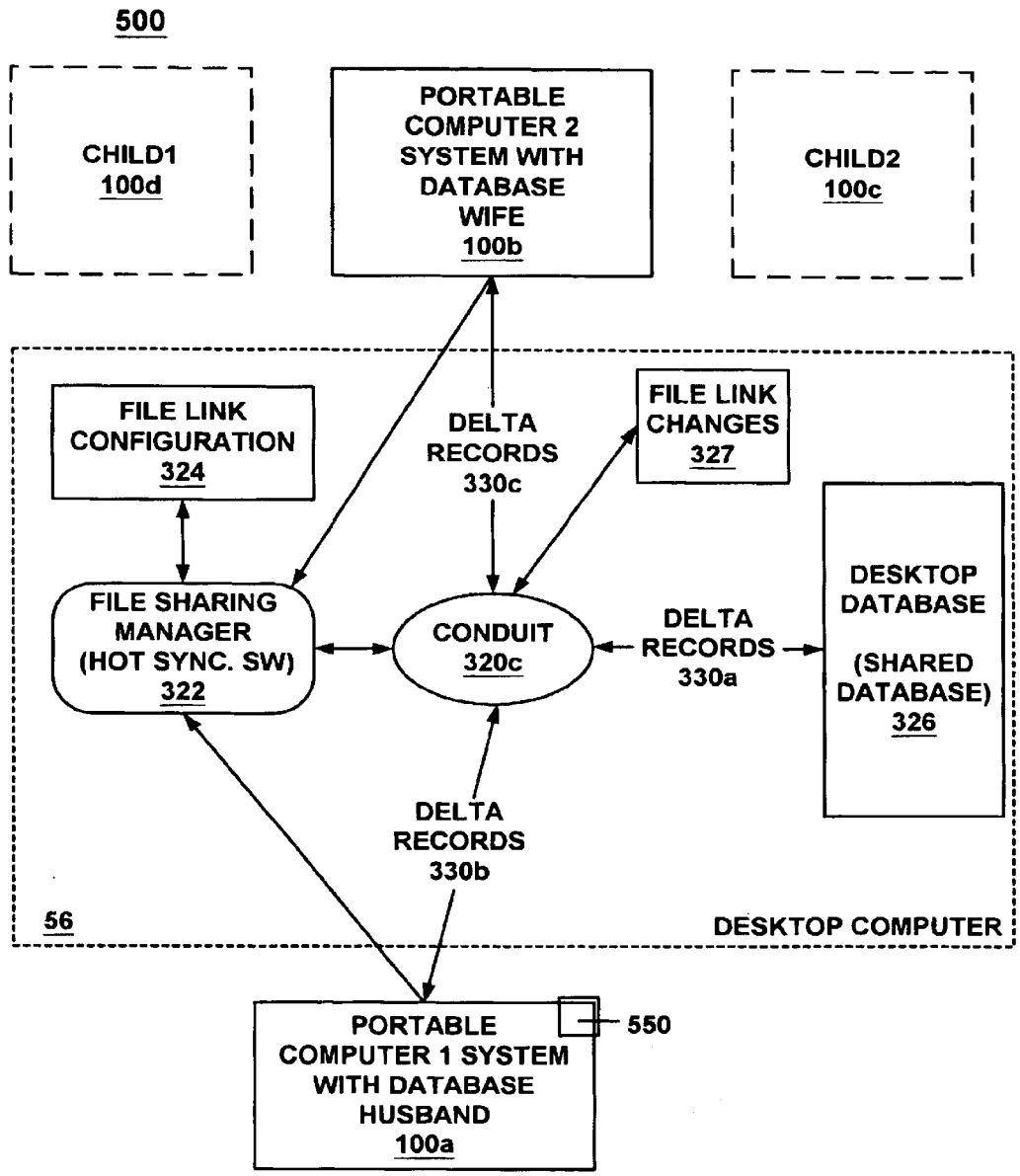
FIG. 13 is a system in accordance with another embodiment of the present invention for allowing a palmtop computer system access to a shared server containing calendar information from multiple users.

FIG. 13 illustrates another embodiment of the present invention. This embodiment 500 allows a portable computer system 100a to access a database of calendar information that contains calendar information from multiple users. In this "family schedule" embodiment, one user can download calendar information from multiple users and view their information in conjunction with his/her own personal calendar information. For instance, assuming a four member family has four palmtop computers, one for each person, the husband can access and view the scheduling information of all the family after all members have synchronized with a desktop computer. Within system 500 is the file sharing manager 322, the file link configuration data 324, conduit 320c and a desktop database 326. A file link changes library 327 is also included (one for each user) to facilitate showing, editing and preserving of other categories.

As shown in FIG. 13, multiple portable computer systems 100a–100d can synchronize their respective calendar information with calendar information stored in the desktop database, but not generally at the same time. When computer system 100a is synchronizing, delta records 330b are forwarded to the desktop database 326 and delta records 330a are forwarded from the desktop database 326 to computer 100a. Similarly, when computer system 100b is synchronizing, delta records 330c are forwarded to the desktop database 326 and delta records 330a are forwarded from the desktop database 326 to computer 100b. After synchronization, calendar information of the user of computer 100a is stored in shared database 326 and calendar information of the user of computer 100b is stored in shared database 326. Multiple other computer systems (100c–100d) with calendar information from other users can also be synchronized with database 326.

It is appreciated that calendar information from each user has its own category name or designation and is stored under that designation. For instance, assuming computer 100b is used by the wife, the category designation "wife" can be defined for any calendar information from computer 100b. Likewise, the category designations "child1" and "child2" can be defined for other computers that synchronize with database 326. The default designation is then assigned for computer 100a. The file link configuration 324 keeps track of the different designations and the different database names for each calendar database of the different computer systems. For instance, below is an exemplary data structure or "linking construct" stored in the file link configuration 324 for a family of four:

| FILE LINK DESIGNATION: | |
| --- | --- |
| SOURCE FILE: | WIFE.DAT |
| CATEGORY | WIFE |
| UPDATE FREQ. | EACH DAY |
| SOURCE FILE: | CHILD1.DAT |
| CATEGORY | CHILD1 |
| UPDATE FREQ. | EACH WEEK |
| SOURCE FILE: | CHILD2.DAT |
| CATEGORY | CHILD2 |
| UPDATE FREQ. | EACH DAY |
| SOURCE FILE: | UNFILED.DAT |
| CATEGORY | UNFILED |
| UPDATE FREQ. | EACH DAY |

FIG. 14 illustrates a process 510 that can be used to share calendar data of multiple users with a single user. FIG. 14 is described with respect to FIG. 15–FIG. 19. At step 515, a computer system 100a interfaces with the central or shared database 326, e.g., residing on desktop computer 56. Calendar information from multiple users is stored in database 326 and this data is downloaded into computer 100a. It is appreciated that the calendar information for each user has its own category name and is stored under that category name when placed into system 100a, e.g., "wife, chid1, chid2," etc. Personal calendar information of system 100a is stored under the default category name, "unfiled." At step 520, computer 100a then synchronizes its personal calendar information with any calendar information of the database 326 that also has the default category designation.

FIG. 15 illustrates the results of step 520 for an exemplary case of a calendar database 550 of system 100a. The calendar information personal to computer 100a is shown as data 560 stored under the category designation "unfiled" 570. This is the default. The calendar information personal to computer 100b is shown as data 564 stored under the category designation "wife" 574. Calendar information 562 and 566 are stored under the designations 572 and 576, respectively. Because calendar information of multiple users can be stored on a single computer system 100a, in this embodiment of the present invention, the user can select which category designation to display and which to hide when running the calendar application. Although category designations can be hidden or shown, the user still is not able to modify them. At the start, only the default category designation is selected for display by the calendar application.

At step 525, the user is allowed to select a date for displaying calendar information and can also select which category or categories of calendar information is to be displayed on display screen 105 (FIG. 2A). FIG. 16 illustrates one implementation using a pulldown window 600 within display 610a while the calendar application is running. In the background is calendar information from the default category before the changes outlined in window 600 take effect. Window 600 is activated whenever the user selects the show/hide option 615 in the menu bar of the calendar application. The window 600 can be closed using a number of well known graphical user interface techniques. Within window 600 is a listing including each category name of the calendar information stored in database 550. Associated with each category name is a show/hide designation ("*") or toggle flag. If this flag is set ("*"), then the corresponding calendar information is to be displayed within the calendar application. If this flag is not set (" "),then the corresponding calendar information is not displayed. As shown in FIG. 16, the "wife" and the "chid2" calendar information have just been selected by the user for display. This corresponds to the step 530 of FIG. 14.

Figure 17:
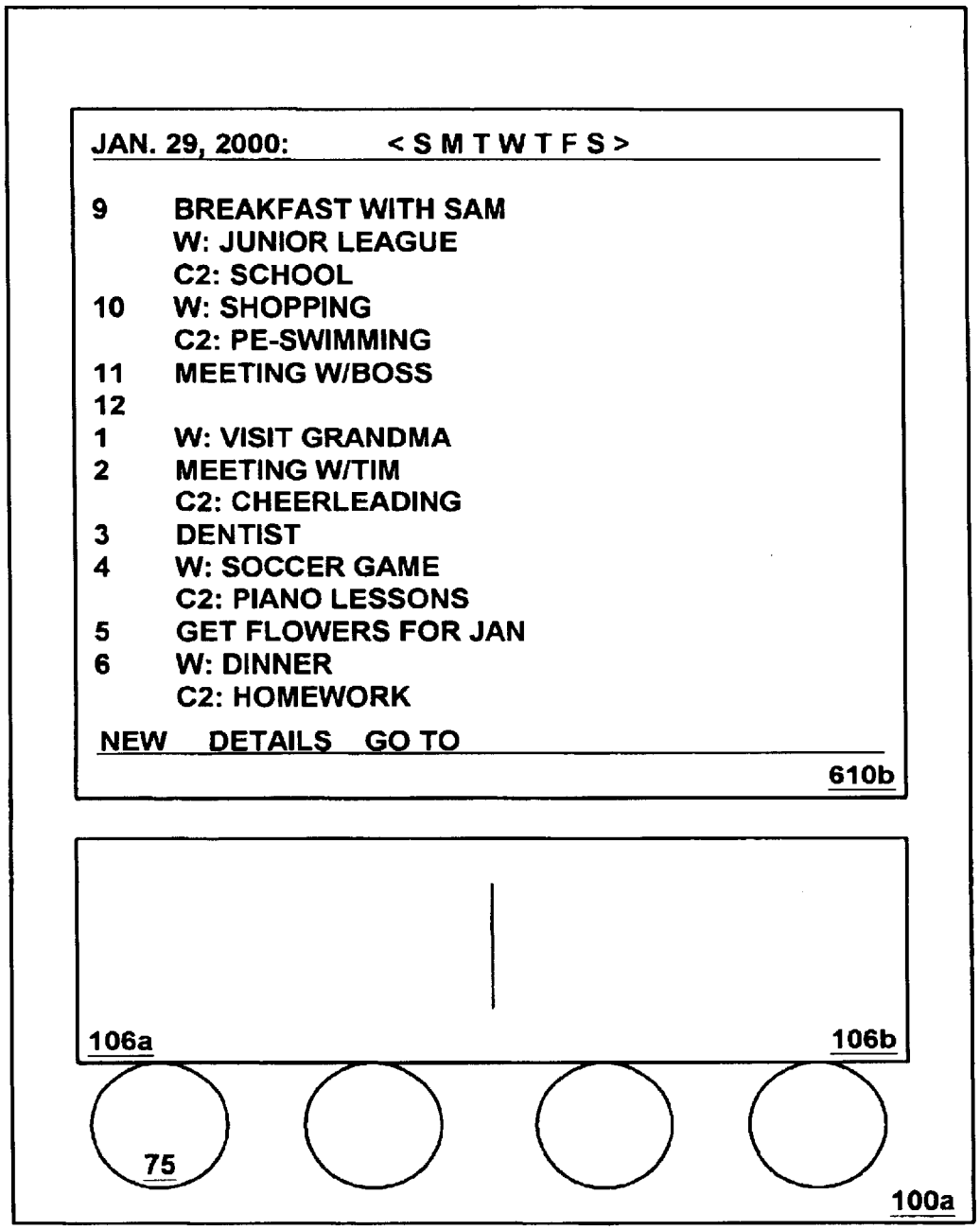
FIG. 17 is a palmtop computer displaying calendar information of three calendar categories thereby illustrating calendar information of multiple users.

FIG. 17 illustrates a display 610b reflecting the result of this change, e.g., after window 600 closes. Along with the default calendar information 560, the calendar information 564 and calendar information 566 are displayed. In order to differentiate the calendar information from category to category, a category initial is used as a designator before each calendar data (except for the default which has no initial). For instance, "w:" is the designator for the calendar data 560 of the "wife" category. Also, "c2:" is the designator for the calendar data 564 of the "chid2" category. It is appreciated that different colors (or shading or underlining or shadowing or italic, etc.) can also be used to differentiate the calendar information of different categories. Using the same display 610a, the user of computer 100a, e.g. the husband, can also view the calendar or schedule information of his wife and one of his children while also seeing his own personal schedule.

It is appreciated that while any of the calendar information can be updated (e.g., at step 525) by computer 100a, changes made by computer 100a to categories that are not the default will not be synchronized back to the database 326 of desktop 56. However, changes made to the calendar information of the default category by computer 100a will be synchronized back to the database 326.

FIG. 18 illustrates the pull down window 600 being activated again and the user selecting child1 category and de-selecting the wife category and the child2 category. This can be performed at step 530. Display 610b (background) illustrates the result before the change goes into effect, e.g., before window 600 is closed.

FIG. 19 illustrates the resultant display 610c after the selection of FIG. 18 is made. In this case, only the default category calendar information 560 and the child1 category calendar information 562 are displayed. The designation, "c1:" is for the calendar data 562. In order to eliminate all of the calendar information except for the personal calendar information, the user can open window 600 and de-select all flags except for the "unfiled" flag which is the default category.

In addition to changing the show/hide flags, the user at step 535 of FIG. 14 can also change the particular day of calendar information to be displayed. At step 540, if synchronization is performed, then step 515 is entered again. Each time calendar information of a non-default category type is downloaded into computer 100a, it over-writes any data of that category that already exists in the computer 100a. However, calendar information of the default category type synchronizes with the database 326. It is appreciated that while process 510 is being performed, multiple other portable computer system s can synchronize their respective default calendar information with the database 326. For instance, while the "wife" category calendar information is a non default category to computer system 100a, it is the default category for computer 100b. Therefore, when computer 100b connects to desktop 56, synchronization occurs between calendar information of the "wife" category that resides on computer 100b and database 326 of desktop 56. The same is true with respect to the computer systems 100c–100d for chid2 and child1.

The preferred embodiment of the present invention, a method and system providing access to a shared database having calendar information and also providing access to a database containing calendar information for multiple users, is thus described. While the present invention has been described in particular embodiments, it should be appreciated that the present invention should not be construed as limited by such embodiments, but rather construed according to the below claims.

What is claimed is:

1. A method of processing information comprising:

a) storing first calendar information under a predetermined category name in a first database on a server, said first database comprising calendar information received from multiple computer systems, said first calendar information comprising event name, time and date information;

b) transferring said first calendar information from said server to a portable computer system, said portable computer system having a second database comprising second calendar information that is differentiated from said first calendar information by a default category name that is different from said predetermined category name, said second calendar information comprising event name, time and date information;

c) displaying together portions of said first and said second calendar information on a display screen of said portable computer system wherein said predetermined category name is unmodifiable by said portable computer system;

d) synchronizing said second database comprising said second calendar information with a third database on a host computer system that is different from said server so that after synchronization said second and third databases contain the same calendar information; and e) removing said first calendar information from said portable computer system without disturbing said second calendar information.

2. A method as described in claim 1 further comprising:

said portable computer system modifying a portion of said first calendar information; and said portable computer system modifying a portion of said second calendar information.

3. A method as described in claim 1 wherein said portable computer system is a palmtop computer system.

4. A method as described in claim 1 further comprising transferring said first calendar information from said server to multiple other portable computer systems, each of said multiple other portable computer systems having respective second calendar information stored under a respective default category name.

5. A method as described in claim 1 wherein said first calendar information is a schedule for a tradeshow.

6. A method as described in claim 1 wherein said step b) comprises:

b1) inserting said portable computer system into a receiving slot of a cradle coupled to said server; and b2) said server transferring said first calendar information to said portable computer system in response to said step b1).

7. A method as described in claim 6 wherein said step e) comprises:

e1) inserting said portable computer system into said receiving slot of said cradle; and e2) removing said first calendar information from said portable computer system.

8. A method as described in claim 1 wherein said step c) comprises displaying said portion of said first calendar information in proximity to a designation representing said predetermined category name.

9. A data processing system comprising:

a server for storing first calendar information stored under a predetermined category name in a first database that comprises calendar information received from multiple computer systems, said first calendar information comprising event name, time and date information;

a software manager resident on said server and for transferring said first calendar information to said portable computer system in response to said portable computer system being inserted into a cradle coupled to said server, said portable computer system having second calendar information stored in a second database under a default category name which is different from said predetermined category name, said second calendar information comprising event name, time and date information;

a host computer system comprising a third database that comprises calendar information associated only with said portable computer system;

a file sharing manager resident on said host computer system and for synchronizing said second calendar information but not said first calendar information with said calendar information in said third database, wherein after synchronization said second and third databases contain the same calendar information;

said portable computer system for displaying together portions of said first and said second calendar information on a display screen of said portable computer system wherein said predetermined category name and said default category name are both unmodifiable by said portable computer system; and said portable computer system also for using said predetermined category name to remove said first calendar information from said portable computer system without disturbing said second calendar information.

10. A system as described in claim 9 wherein said portable computer system is also for modifying a portion of said first calendar information and also for modifying a portion of said second calendar information.

11. A system as described in claim 9 wherein said portable computer system is a palmtop computer system.

12. A system as described in claim 9 further comprising multiple other portable computer systems and wherein said software manager is also for separately transferring said first calendar information to said multiple other portable computer systems, each of said multiple other portable computer systems having respective second calendar information stored under said default category name.

13. A system as described in claim 9 wherein said first calendar information is a schedule for a tradeshow.

14. A method of processing information comprising:

a) storing first and second calendar information stored, respectively, under first and second category names, said first and second calendar information stored in a database on a server, said database comprising calendar information received from multiple computer systems, said first calendar information corresponding to a first portable computer system and said second calendar information corresponding to a second portable computer system, said first and second calendar information comprising event name, time and date information;

b) synchronizing said first calendar information in said database but not said second calendar information with calendar information of said first category name stored on said first portable computer system wherein modifications to said first calendar information in said database are reflected in said first portable computer system and vice-versa;

c) transferring said second calendar information from said server to said first portable computer system;

d) designating a first flag indicating whether or not said second calendar information is to be displayed on said first portable computer system;

e) displaying said first calendar information on a display screen of said first portable computer system; and f) displaying said second calendar information, together with said first calendar information, on said display screen provided said first flag indicates that said second calendar information is to be displayed and otherwise not displaying said second calendar information.

15. A method as described in claim 14 further comprising the step of synchronizing said second calendar information in said database but not said first calendar information with calendar information of said second category name stored on said second portable computer system wherein modifications in said database are reflected in said second portable computer system and vice-versa.

16. A method as described in claim 14 further comprising:

storing, in said database on said server server, third calendar information stored under a third category name and comprising event name, time and date information, said third calendar information corresponding to a third portable computer system;

transferring said third calendar information from said server to said first portable computer system;

designating a second flag indicating whether or not said third calendar information is to be displayed on said first portable computer system; and displaying said third calendar information on said display screen provided said second flag indicates that said third calendar information is to be displayed and otherwise not displaying said third calendar information.

17. A method as described in claim 14 further comprising:

storing, in said database on said server, third calendar information stored under a third category name and comprising event name, time and date information, said third calendar information corresponding to a third portable computer system;

transferring said third calendar information from said server to said second portable computer system;

designating a second flag indicating whether or not said third calendar information is to be displayed on said second portable computer system; and displaying said third calendar information on said display screen provided said second flag indicates that said third calendar information is to be displayed and otherwise not displaying said third calendar information.

18. A method as described in claim 17 further comprising synchronizing said third calendar information in said database but not said first and second calendar information with calendar information of said third category name stored on a third portable computer system wherein modifications in said database are reflected in said third portable computer system and vice-versa.

19. A method as described in claim 14 further comprising modifying a portion of said first calendar information.

20. A method as described in claim 14 wherein said first portable computer system is a palmtop computer system.

21. A method as described in claim 14 wherein said second portable computer system is a palmtop computer system.

22. A method as described in claim 14 wherein said step d) comprises toggling said first flag on and off by using a pull down menu that lists said second category name and displays said first flag.

* * * * *